United States Patent
Shin

(10) Patent No.: US 10,249,023 B2
(45) Date of Patent: Apr. 2, 2019

(54) PATCH WARPER CIRCUIT FOR IMAGE PROCESSING

(71) Applicant: Apple Inc., Cupertino, CA (US)

(72) Inventor: Jaewon Shin, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 43 days.

(21) Appl. No.: 15/499,755

(22) Filed: Apr. 27, 2017

(65) Prior Publication Data

US 2018/0315164 A1 Nov. 1, 2018

(51) Int. Cl.
*G06T 3/00* (2006.01)
*G06T 3/40* (2006.01)

(52) U.S. Cl.
CPC .......... *G06T 3/4015* (2013.01); *G06T 3/0093* (2013.01); *G06T 3/4007* (2013.01)

(58) Field of Classification Search
None
See application file for complete search history.

(56) References Cited

U.S. PATENT DOCUMENTS

| 7,376,286 | B2 * | 5/2008 | Locker | G06T 3/606 345/649 |
| 8,482,573 | B2 * | 7/2013 | Mallett | G06T 1/60 345/531 |
| 2006/0050074 | A1 * | 3/2006 | Bassi | G06T 3/0006 345/427 |

OTHER PUBLICATIONS

A Novel Approach to Real-time Bilinear Interpolation. Gribbon et al., 2004.*
Motten, A., et al., "Adaptive memory architecture for real-time image warping," 2012 IEEE 30th International Conference on Computer Design (ICCD), Sep. 30, 2012-Oct. 3, 2012, 6 pages.

* cited by examiner

*Primary Examiner* — Delomia L Gilliard
(74) *Attorney, Agent, or Firm* — Fenwick & West LLP

(57) ABSTRACT

Embodiments relate to a patch processor that warps patches of input image data. The patch processor includes a patch direct memory access (DMA) circuit that obtains the patches via direct memory access. The patch processor includes a patch warper circuit that generates warped patches by processing the patches by performing interpolation in a raster scan fashion using a set of coordinates, for example. The patch warper circuit may also process pixels of the patches using an adder or subtractor circuit. In addition, the patch warper circuit may interleave warped patches of different image channels such as RGB or YCbCr colors. The patch warper circuit can also double-buffer the patches and warped patches.

20 Claims, 8 Drawing Sheets

PATCH WARPER CIRCUIT FOR IMAGE PROCESSING

BACKGROUND

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on a central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

Image processing algorithms such as normalized cross-correlation (NCC) matching for simultaneous localization and mapping (SLAM) applications use warped images from a reconstructed model of an environment mapped by image sensors. However, executing conventional algorithms for image warping on the CPU is computationally demanding.

SUMMARY

Embodiments relate to warping patches of images retrieved from source memory by a patch processor. The patch processor includes a patch direct memory access (DMA) circuit and a patch warper circuit. The patch DMA circuit obtains patches via direct memory access and provides the patches to the patch warper circuit. The patch warper circuit generates warped patches by processing the patches based on warping parameters and using a transformation circuit or a sampling circuit. The transformation circuit may perform interpolation in a raster scan fashion using a set of coordinates indicated by the warping parameters. The sampling circuit may include an adder or subtractor circuit to process pixels of patches.

In one embodiment, the patch warper circuit includes an interleaver circuit to interleave pixels of warped patches of different image channels such as RGB or YCbCr colors.

In one embodiment, the patch warper circuit can double-buffer the input patches and output warped patches.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to an image signal processing pipeline for warping patches of input image data. The image signal processor may include a patch processor to warp the patches before a front-end circuit portion performs pre-processing. The patch processor obtains patches, for example, from source memory via direct memory access. The patch processor can perform interpolation or use an adder/subtractor circuit to generate warped patches by processing pixels of the input patches. By performing patch warping using circuits of the patch processor, resource of a CPU of an electronic device is not diverted to perform patch warping operations.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
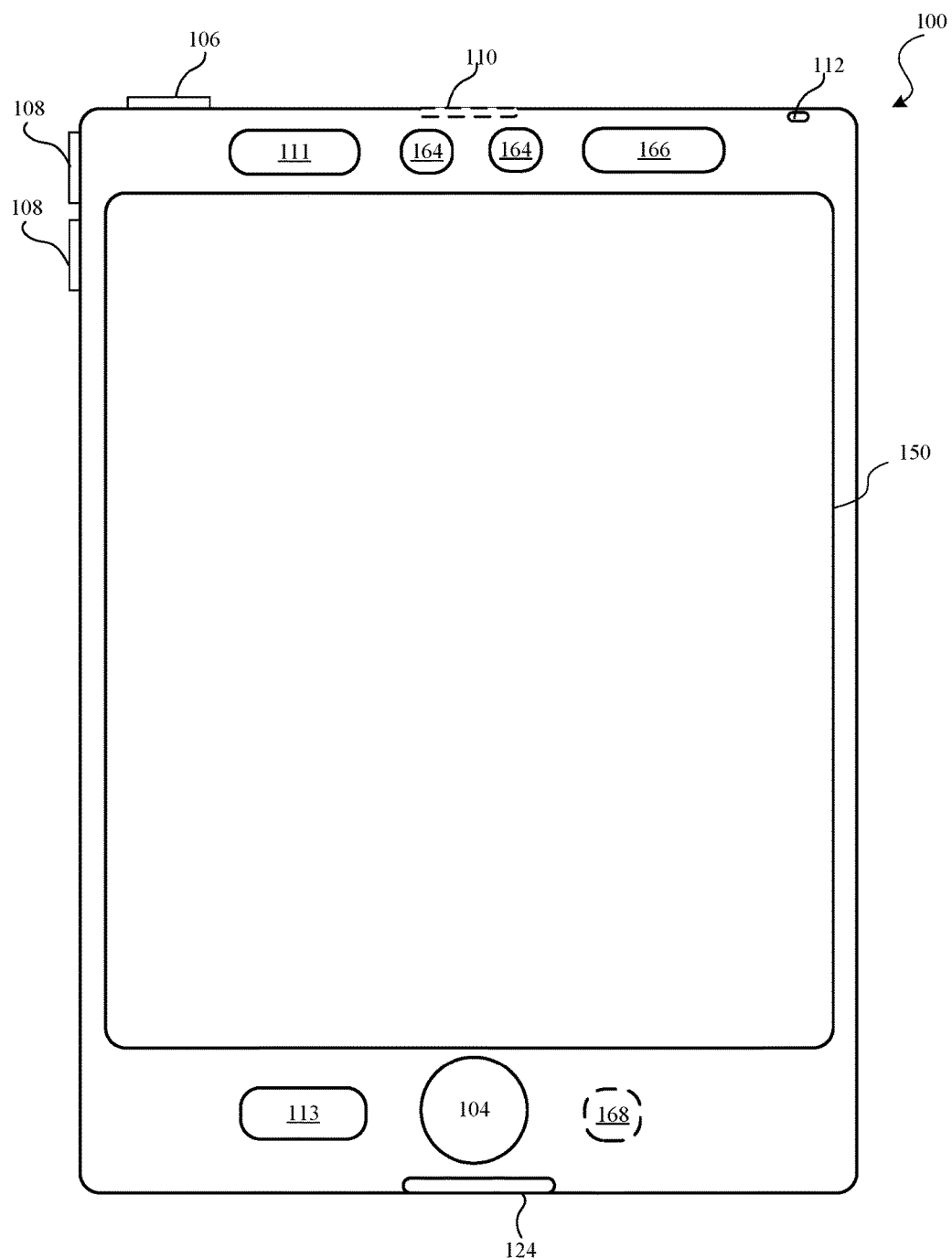
FIG. 1 is a high-level diagram of an electronic device, according to one embodiment.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
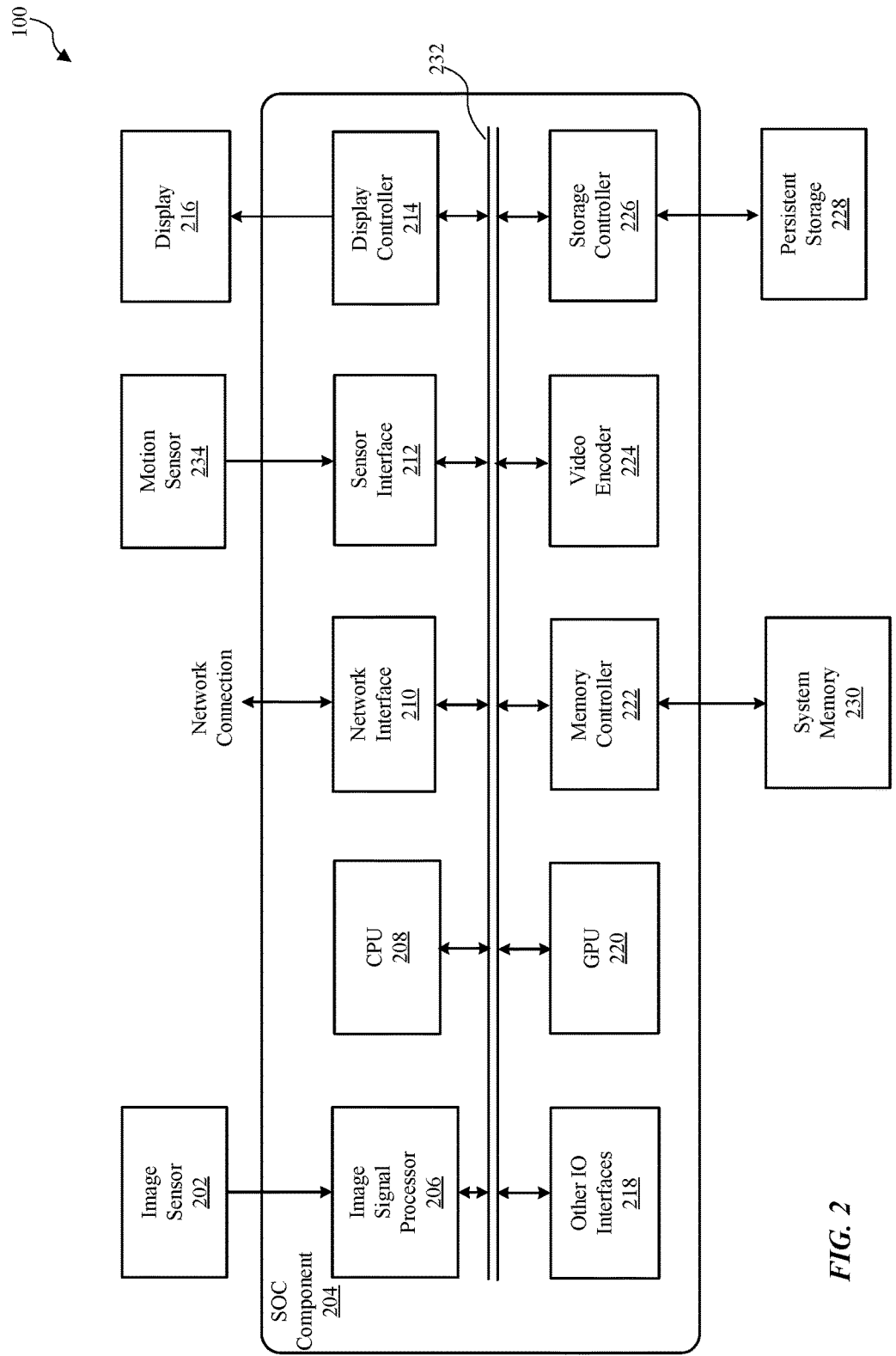
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, motion sensor 234, and display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

Image sensor 202 is a component for capturing image data and may be embodied, for example, as a complementary metal-oxide-semiconductor (CMOS) active-pixel sensor, a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color filter array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), NAND or NOR flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/ output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor 220 or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensor 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
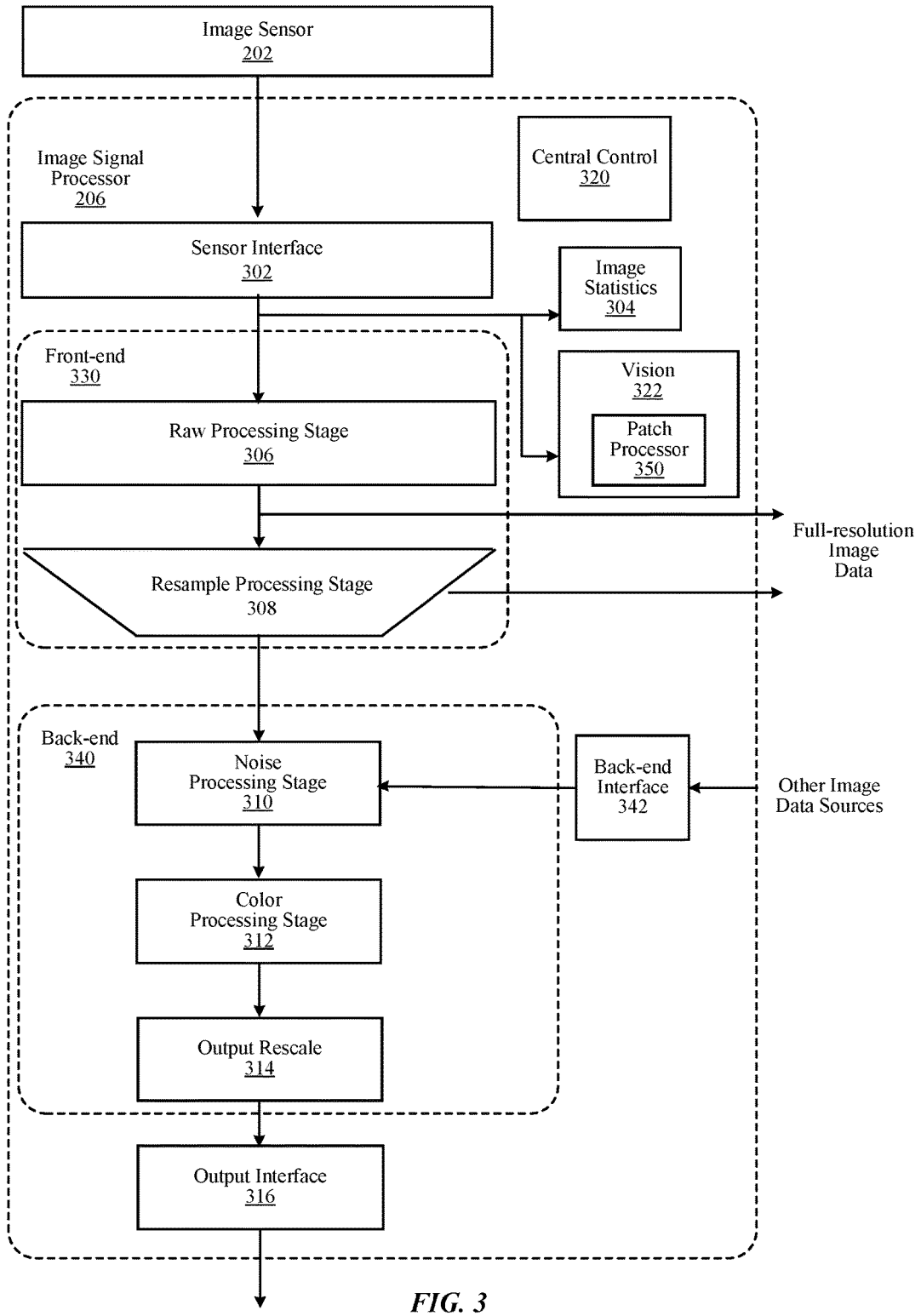
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to image sensor 202 to receive raw image data. ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, and output interface 316. ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery, and/or defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle). Although embodiments described herein include embodiments in which the one or more back-end pipeline stages 340 process image data at a different rate than an initial data rate, in some embodiments back-end pipeline stages 340 may process image data at the initial data rate.

Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (i.e., horizontally, line by line). The subsequent processes in the pipeline may also be performed in raster order and the result may also be output in raster order. Although only a single image sensor 202 and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, and Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, and Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform special image effects, including black and white conversion, sepia tone conversion, negative conversion, or solarize conversion. For the purpose of Gamma mapping, lookup tables (or other structures that index pixel values to another value) for different color components or channels of each pixel (e.g., a separate lookup table for Y, Cb, and Cr color components) may be used. Color space conversion refers to converting color space of an input image data into a different format. In one embodiment, resample processing stage 308 converts RGB format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, mask patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), auto focus (AF)), histograms (e.g., 2D color or component), and any other image data information may be collected or tracked. In some embodiments, certain pixels' values, or areas of pixel values may be excluded from collections of certain statistics data (e.g., AF statistics) when preceding operations identify clipped pixels. Although only a single image statistics module 304 is illustrated in FIG. 3, multiple image statistics modules may be included in ISP 206. In such embodiments, each statistic module may be programmed by central control module 320 to collect different information for the same or different image data.

Vision module 322 performs various operations to facilitate computer vision operations at CPU 208 such as facial detection in image data. The vision module 322 includes a patch processor 350 to warp patches of input image data. Additionally, patch processor 350 may obtain patches using direct memory access, and is described below in more detail with respect to FIGS. 4 and 5. The vision module 322 may perform various operations including pre-processing, global tone-mapping and Gamma correction, vision noise filtering, resizing, keypoint detection, convolution and generation of histogram-of-orientation gradients (HOG). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing cameral pose and object tracking. Keypoint detection refers to the process of identifying such keypoints in an image. Convolution may be used in image/video processing and machine vision. Convolution may be performed, for example, to generate edge maps of images or smoothen images. HOG provides descriptions of image patches for tasks in image analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provide it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform special image effects. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (i.e. no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 316 to various other components of the electronic device 100, as discussed above with regard to FIGS. 1 and 2.

In various embodiments, the functionally of components 302 through 342 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware, or software.

Example Patch Processor

Figure 4:
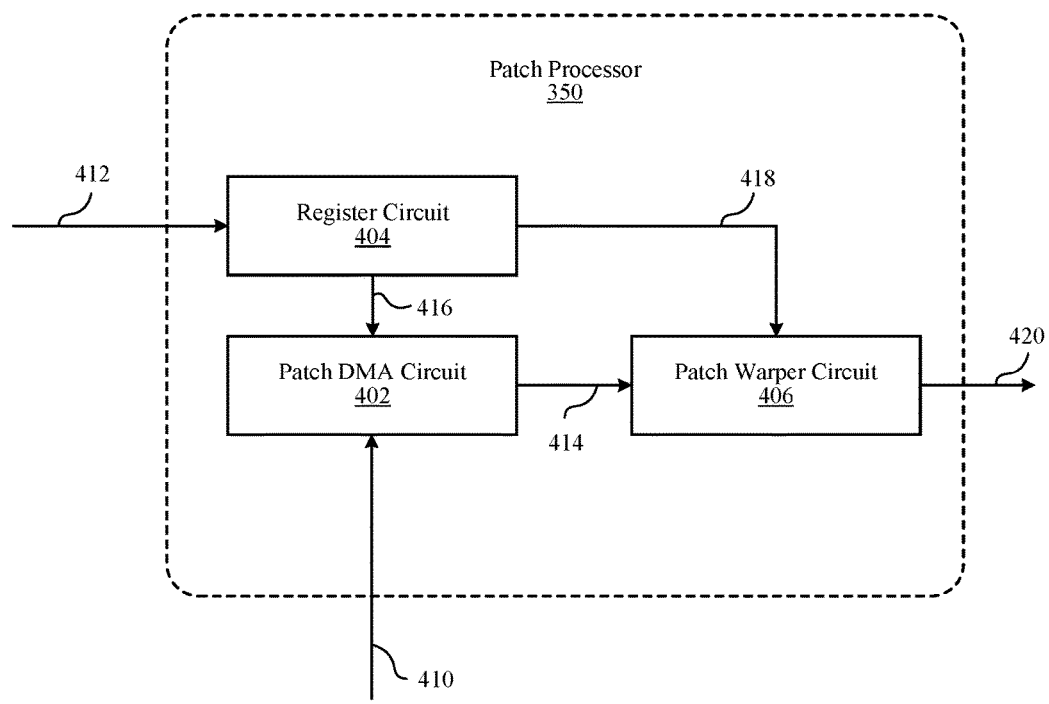
FIG. 4 is a block diagram illustrating a patch processor, according to one embodiment.

FIG. 4 is a block diagram illustrating a patch processor 350, according to one embodiment. The patch processor 350 may include, among other components, patch direct memory access (DMA) circuit 402, register circuit 404, and patch warper circuit 406.

In the embodiment of FIG. 4, patch DMA circuit 402 is coupled to a source memory (e.g., system memory 230, persistent storage 228, or a cache) of the device 100. Patch DMA circuit 402 obtains patches of input image data 410 from the source memory. For example, patch DMA circuit 402 obtains the input image data 410 from system memory 230 via direct memory access. Since direct memory access operates independently from the CPU 208, the patch DMA circuit 402 may offload resource intensive operations or other overhead associated with the warping operations from the CPU 208.

Patch DMA circuit 402 accesses the register circuit 404 to receive a warping parameter 416, in some embodiments. Patch DMA circuit 402 obtains the patches of the input image data 410 according to the warping parameter 416. For example, the warping parameter includes a set of coordinates of one or more of the patches (e.g., coordinates of vertices of a rectangle or other type of polygon). As another example, the warping parameter includes a coordinate point of a patch along with a height and width of the patch. Based on the warping parameter, the patch DMA circuit 402 determines additional coordinate points that define the patch having a rectangular shape.

In one embodiment, the patch DMA circuit 402 obtains up to 2048 patches at a time, where the warping parameter 416 includes a coordinate point for each of the patches. Two or more patches may overlap each other in the input image data 410. Each of the patches may have a resolution of up to 32 pixels by 32 pixels, and include up to three different image channels (e.g., RGB or YCbCr). In other embodiments, the patches may have a greater resolution or a greater number of image channels. In use cases where the patch processor 350 bypasses the patch warper circuit 406, the patches may have a resolution of up to 1000 pixels by 1000 pixels.

Register circuit 404 stores warping parameters 412 to be retrieved by other components of the patch processor 350. The register circuit 404 receives warping parameters 412 from the CPU 208, ISP 206, or another suitable component of the device 100. In addition, the warping parameters stored by the register circuit 404 may be updated over time. The register circuit 404 may include a lookup table for storing or indexing warping parameters.

Patch warper circuit 406 receives the patches 414 of the input image from the patch DMA circuit 402. The patch warper circuit 406 warps the patches by processing the patches according to one or more warping parameters. The patch warper circuit 406 accesses the register circuit 404 to receive a warping parameter 418, which may be different than the warping parameter 416 received by the patch DMA circuit 402. For example, the warping parameter 418 includes a set of coordinates of warped patches for an output image. Examples of warped patches are illustrated in FIG. 6. Patch warper circuit 406 may provide the warped patches 420 to other components of the ISP 206 or SOC component 204 for further processing. Additionally, the patch warper circuit 406 may provide the warped patches 420 for storage in the source memory, e.g., from which the input image data was obtained. The patch warper circuit 406 is further described below with respect to FIG. 5.

Figure 5:
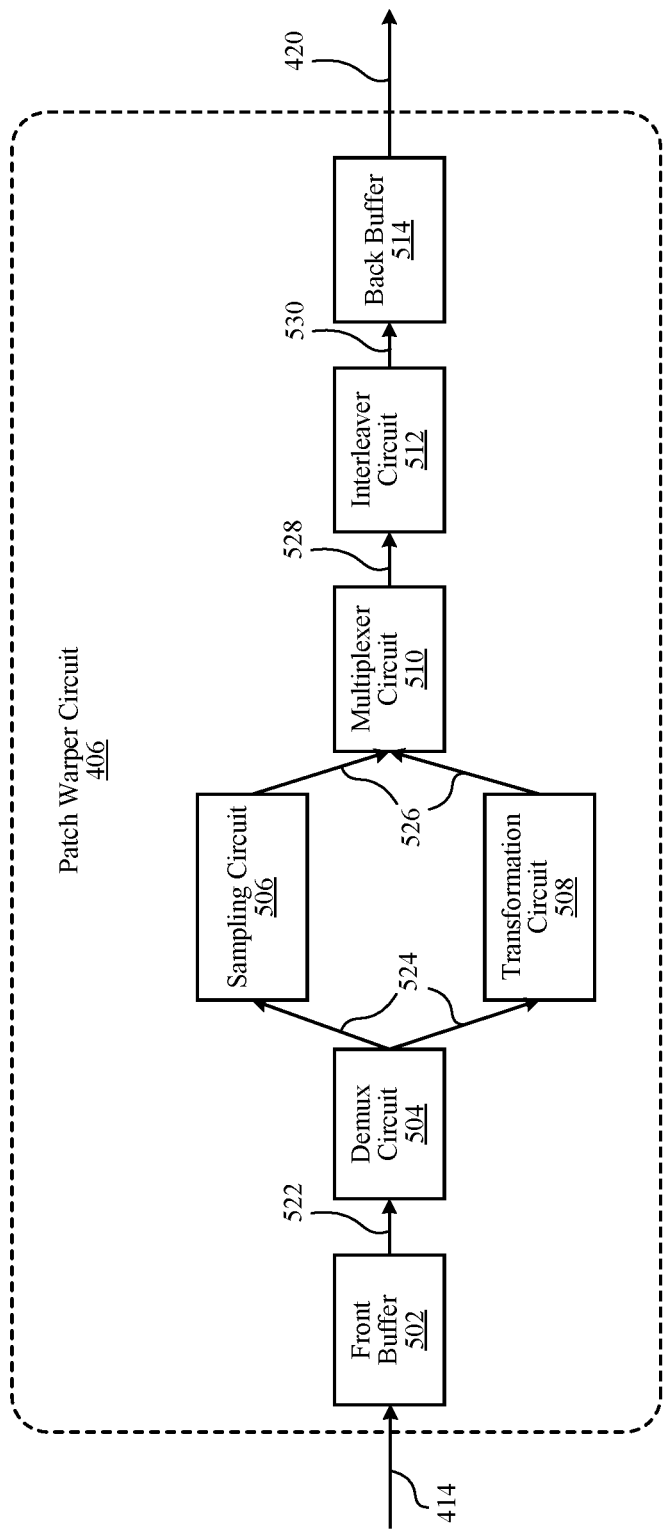
FIG. 5 is a block diagram illustrating a pipeline of a patch warper circuit, according to one embodiment.
Figure 6:
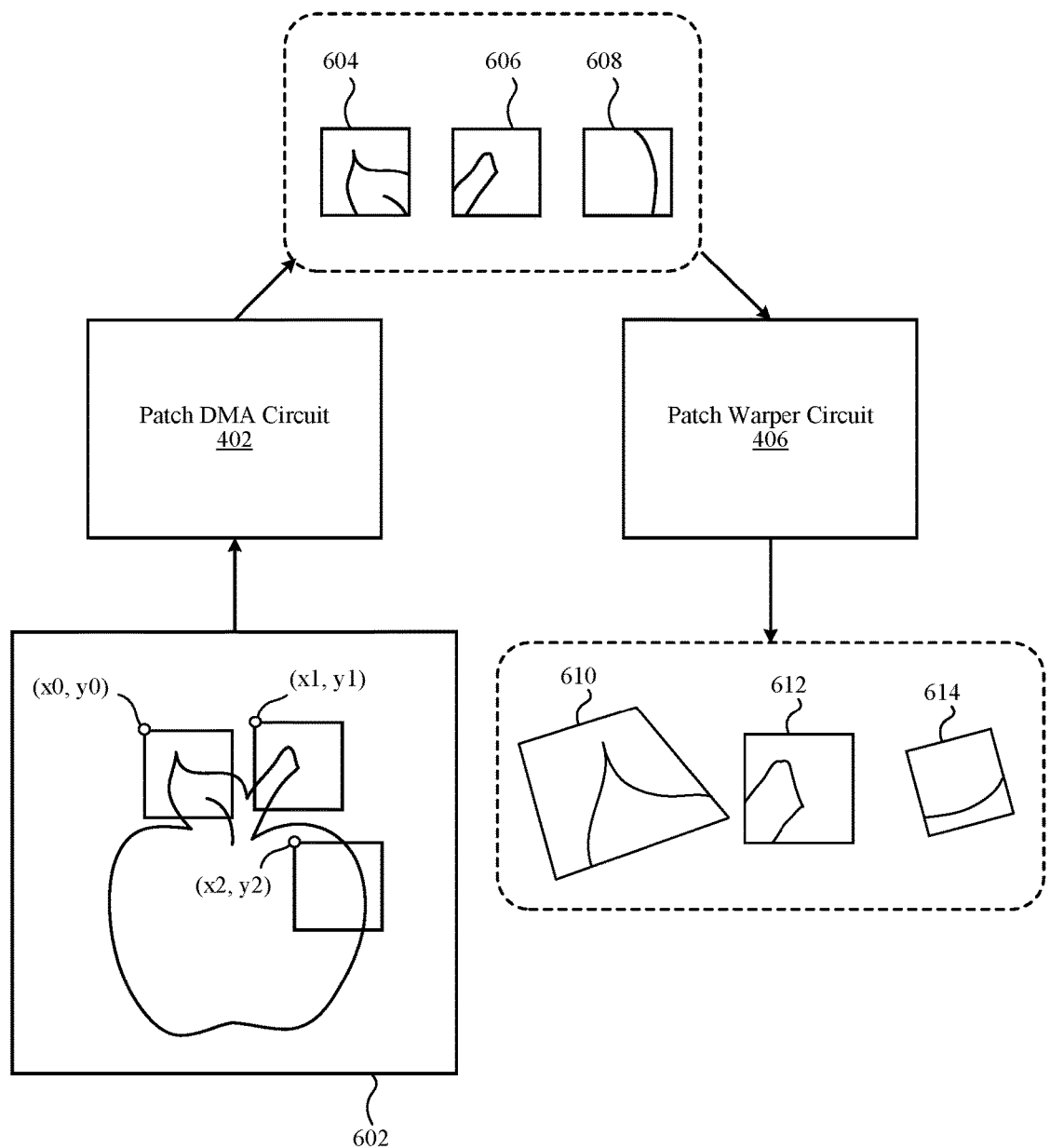
FIG. 6 is a diagram illustrating patches of input image data, according to one embodiment.

FIG. 5 is a block diagram illustrating a pipeline of the patch warper circuit 406, according to one embodiment. The patch warper circuit 406 may include, among other components, front buffer 502, demultiplexer (demux) circuit 504, sampling circuit 506, transformation circuit 508, multiplexer circuit 510, interleaver circuit 512, and back buffer 514.

Front buffer 502 receives and stores patches 414 of an input image from the patch DMA circuit 402. Front buffer 502 buffers the patches for reading by the demultiplexer circuit 504 or other components of the patch warper circuit 406 such as the sampling circuit 506 or the transformation circuit 508. In some embodiments, front buffer 502 may be omitted.

Demultiplexer circuit 504 receives patches 522 of an input image from the front buffer 502 and selectively forwards the patches to other components of the patch warper circuit 406. In order to determine which components to forward the patches, the demultiplexer circuit 504 may access the register circuit 404 to receive a warping parameter. In the embodiment of FIG. 5, the demultiplexer circuit 504 may select between forwarding the patches 524 to the transformation circuit 508, multiplexer circuit 510, or both, according to a bit specified in the warping parameter.

Sampling circuit 506 generates warped patches by processing patches of image data read by the patch warper circuit 406. The sampling circuit 506 may receive patches 524 forwarded from the demultiplexer circuit 504 or from the front buffer 502. The sampling circuit 506 may warp patches by interpolating pixel data of an input patch according to a warping parameter to generate a warped version of the input patch. For this purpose, the sampling circuit 506 uses interpolation algorithms such as bilinear interpolation, bicubic interpolation, nearest neighbor, or other types of interpolation algorithms. In one embodiment, the sampling circuit 506 performs interpolation in a raster scan order as indicated by the warping parameter, an example of which is further described below with reference to FIG. 7. The sampling circuit 506 may provide the warped patches 526 to the multiplexer circuit 510.

Transformation circuit 508 generates warped patches by adding or subtracting pixel data of an input patch to generate a warped version of the input. The transformation circuit 508 may receive patches 524 forwarded from the demultiplexer circuit 504 or from the front buffer 502. The transformation circuit 508 may warp patches according to a warping parameter received from the register circuit 404. The transformation circuit 508 may include, for example, adder circuits, subtractor circuits, adder-subtractor circuits, or other types of circuits to perform the adding or subtracting operations on the pixel data. The transformation circuit 508 may provide the warped patches 526 to the multiplexer circuit 510.

Multiplexer circuit 510 selects warped patches received from other components of the patch warper circuit 406. The multiplexer circuit 510 may access the register circuit 404 to receive a warping parameter, which is used to determine which from which component to select warped patches. For example, the multiplexer circuit 510 selects to receive warped patches 526 from the transformation circuit 508 or multiplexer circuit 510. The multiplexer circuit 510 provides the selected warped patches 528 to the interleaver circuit 512, the back buffer 514, or another component outside the patch warper circuit 406.

Interleaver circuit 512 interleaves processed pixels of different image channels. The interleaver circuit 512 may receive two or more warped patches 528 from the multiplexer circuit 510. For instance, a first warped patch is of a first image channel and a second warped patch is of a second image channel different than the first image channel. In an example use case where the patch warper circuit 406 processes patches of RGB color image, the first and second channels may be any one of red, green, or blue. In another embodiment where the processed image is of the YCbCr color model, the first and second channels may be any one of the luma component (Y), blue-difference chroma component (Cb), or red-difference chroma component (Cr). The interleaver circuit 512 may also interleave pixels of images having other types of color channels such as HSV (hue, saturation, value) and CMYK (cyan, magenta, yellow, and black). The interleaver circuit 512 may provide interleaved patches 530 to the back buffer 514 or another component of the ISP 206.

Back buffer 514 buffers warped patches for reading by other components of the image processing pipeline shown in FIG. 3. Back buffer 514 may receive warped patches 530 from the interleaver circuit 512, or another component of the patch warper circuit 406 such as the multiplexer circuit 510. The back buffer 514 may output the buffered warped patches for further processing by the ISP 206. The patch warper circuit 406 may output the warped patches 420 from the back buffer 514 to system memory 230 (e.g., DRAM) or another memory of the device 110. In some embodiments, the warped patches output by the patch warper circuit 406 may have the same maximum resolution as the patches received by the patch warper circuit 406 from the patch DMA circuit 402.

Example Warped Image Patches

FIG. 6 is a diagram illustrating image patches of input image data, according to one embodiment. In the example shown in FIG. 6, the patch DMA circuit 402 obtains three patches of the input image 602 depicting an apple. In particular, the patch DMA circuit 402 obtains the three patches according to a set of coordinates (x0, y0), (x1, y1), and (x2, y2), as well as a height and width for the patches, e.g., included in a warping parameter obtained from the register circuit 404. The patch DMA circuit 402 determines the boundaries of one of the three rectangular patches by using one of the coordinates as an origin point (e.g., the top left corner of the patch) and using the height and width to determine the other three corner coordinates of the patch. In other embodiments, the warping parameter may include sets of coordinates indicating coordinate points for all vertices (corners) of the rectangular patches.

The patch DMA circuit 402 provides the three patches 604, 606, and 608 to the patch warper circuit 406. The patch warper circuit 406 generates warped patches 610, 612, and 614, which are warped versions of the patches 604, 606, and 608, respectively. The patch warper circuit 406 may warp patches by performing one or more geometric transformations such as scaling, skewing, cropping, or rotating the patches. The patch warper circuit 406 processes the patches according to warping parameters to generate the warped patch. For example, the warping parameters indicate a scaling factor to enlarge, shrink, or skew a patch, coordinates to crop a patch, a degree to rotate a patch, or another type of geometric transformation. The warped patch 610 is further described below with respect to FIG. 7.

Figure 7:
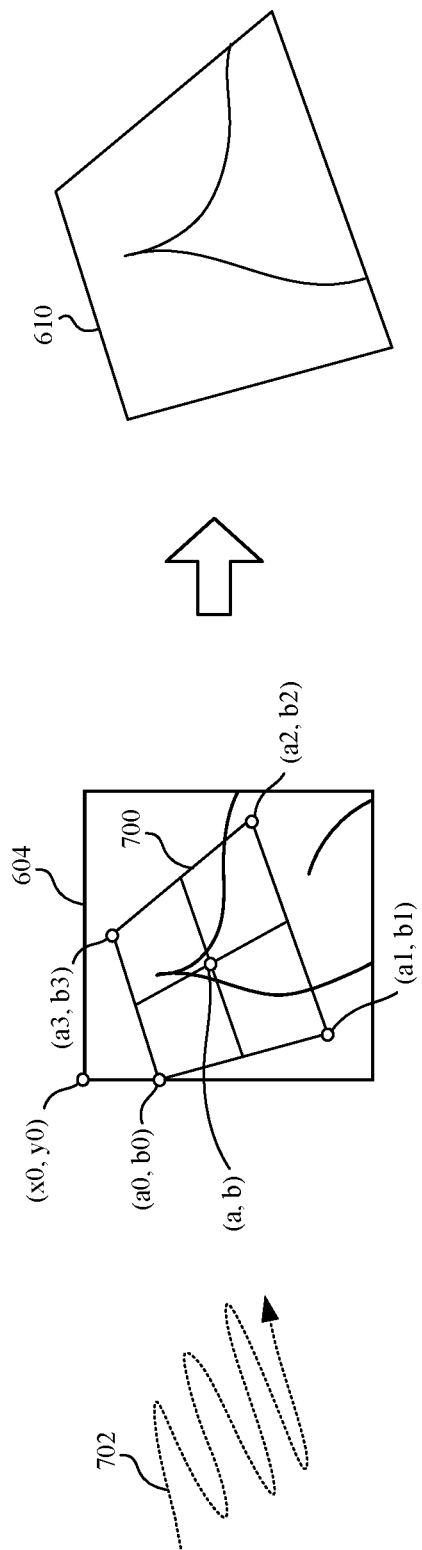
FIG. 7 is a diagram illustrating warping of one of the patches shown in FIG. 6, according to one embodiment.

FIG. 7 is a diagram illustrating warping of one of the image patches shown in FIG. 6, according to one embodiment. In the example shown in FIG. 7, the patch 604 includes of portion of the leaf of the apple depicted in the input image 602 previously shown in FIG. 6. The patch warper circuit 406 obtains warping parameters including a set of coordinates (a0, b0), (a1, b1), (a2, b2), and (a3, b3), which indicate vertices of a polygon within the patch 604. The patch warper circuit 406 obtains a cropped patch 700 of the patch 604 by using the set of coordinates to extract pixels of the polygon 700. For instance, the patch warper circuit 406 uses interpolation of the four vertices of the polygon 700 (or another set of neighboring pixels) to determine the pixel corresponding to the center point (a, b). The patch warper circuit 406 may process the cropped patch 700 using interpolation in a raster scan fashion as indicated by a warping parameter. In the example shown in FIG. 7, the raster scan 702 starts from the top left corner and traverses pixels of the cropped patch 700 in a serpentine and top-to-bottom order. In other embodiments, the patch warper circuit 406 may process patches or cropped patches in any other suitable fashion (e.g., by quadrants or a non-linear fashion), other order, or other start and end points.

In addition, the patch warper circuit 406 may also enlarge (or shrink) the cropped patch 700, according to a scaling factor of the warping parameter, to generate the warped patch 610. Thus as shown in this example, the warped patch 610 is a cropped and scaled version of the portion of the leaf from the patch 604. In some embodiments, warped patches may have a non-rectangular shape such as the warped patch 610. In other examples, the patch warper circuit 406 may generate warped patches without cropping or skewing patches such that the input and output resolution or dimensions remain constant. For instance, the patch warper circuit 406 mirrors ("flips") a patch about a vertical or horizontal axis, or rotates a patch by 90 degrees, 180 degrees, or 270 degrees, e.g., about a center point of the patch. Thus, the patch warper circuit 406 may use the same coordinates of an input patch (e.g., indicating vertices of a rectangular patch) as the coordinates to generate a corresponding warped patch.

Example Process Flow

Figure 8:
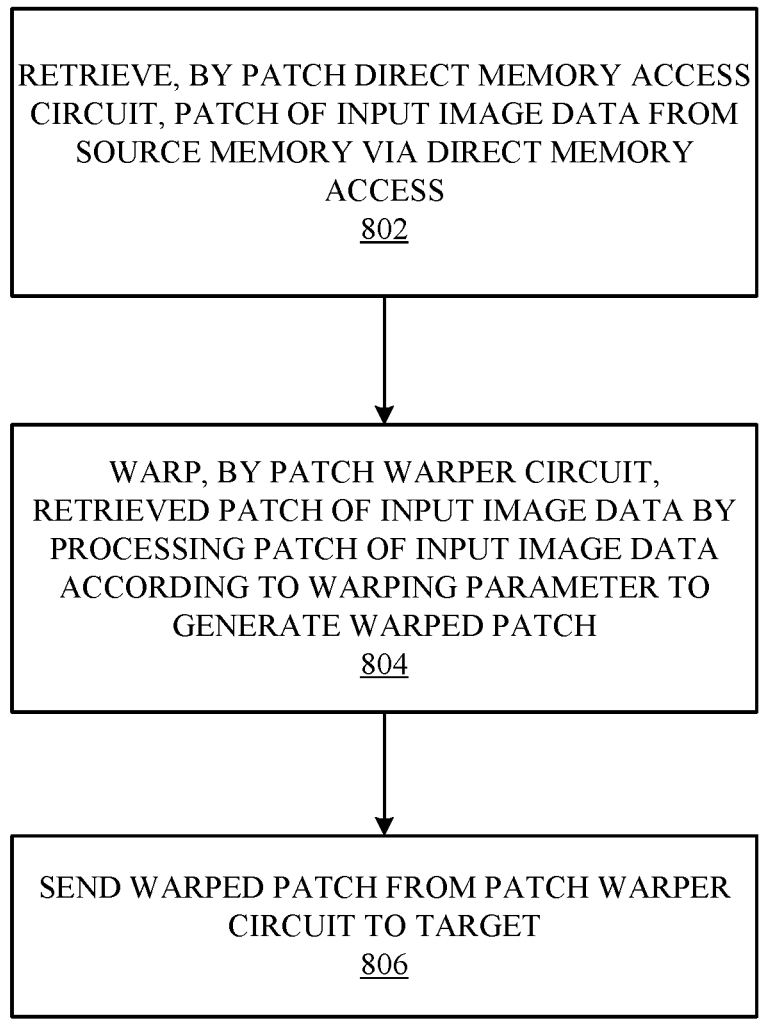
FIG. 8 is a flowchart illustrating a method of warping image data obtained using direct memory access, according to one embodiment.

FIG. 8 is a flowchart illustrating a method of warping image data obtained using direct memory access, according to one embodiment. Some embodiments may include different and/or additional steps, or perform the steps in different orders.

In one embodiment, the patch DMA circuit 402 of the patch processor 350 retrieves 802 a patch of input image data from a source memory via direct memory access. The patch warper circuit 406 receives the retrieved patch from the patch DMA circuit 402 for processing.

The demultiplexer circuit 504 of the patch warper circuit 406 may selectively forward the retrieved patch to sampling circuit 506 or a transformation circuit 508. The patch warper circuit 406 warps 804 the retrieved patch of the input image data by processing the patch using the sampling circuit 506 or the transformation circuit 508. Further, the patch warper circuit 406 processes the patch according to one or more warping parameters to generate a warped patch. The patch warper circuit 406 may receive the warping parameters by accessing a register circuit 404.

An interleaver circuit 512 may interleave pixels of the warped patch with pixels of another warped patch, where the warped patch is of a first image channel and the other warped patch is of a second image channel, for example, different RGB or YCbCr color channels. The patch warper circuit 406 may double-buffer patches and warped patches using a front buffer 502 and back buffer 514. The patch warper circuit 406 sends 806 the warped patch to a target such as another component of the ISP 206 or device 100.

In some embodiments, the patch processor 350 may perform the steps 802-806 in parallel for multiple patches (or image channels) of an input image. For example, up to 2048 patches of up to three image channels may be processed at a time.

The language used in the specification has been principally selected for readability and instructional purposes, and it may not have been selected to delineate or circumscribe the inventive subject matter. It is therefore intended that the scope of the disclosure of the embodiments of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A patch processor in an image signal processor, comprising:
   a patch direct memory access circuit coupled to a source memory and configured to obtain patches of input image data from a source memory via direct memory access using a first warping parameter indicating at least one coordinate of the patches, the patches corresponding to a subset of the input image data; and
   a patch warper circuit coupled to the patch direct memory access circuit to receive the patches of the input image data, the patch warper circuit configured to warp the patches of the input image data by processing the patches of the input image data according to a second warping parameter to generate warped patches.

2. The patch processor of claim 1, wherein the patch warper circuit comprises:
   a demultiplexer circuit coupled to the patch direct memory access circuit, the demultiplexer circuit configured to selectively forward the patches of the input image data;
   a transformation circuit coupled to the demultiplexer circuit, the transformation circuit configured to generate the warped patches by adding or subtracting pixel data in the patches of the input image data forwarded by the demultiplexer circuit; and
   a sampling circuit coupled to the demultiplexer circuit, the sampling circuit configured generate the warped patches by interpolating the pixel data in the patches of the input image data forwarded by the demultiplexer circuit.

3. The patch processor of claim 2, wherein the sampling circuit is further configured to process the patches of the input data using bilinear interpolation in a raster scan fashion.

4. The patch processor of claim 2, wherein the patch warper circuit further comprises:
   a multiplexer circuit coupled to the transformation circuit and the sampling circuit, the multiplexer circuit configured to receive the warped patches from the transformation circuit or the sampling circuit and output the received warped patches; and
   an interleaver circuit coupled to the multiplexer circuit to receive the warped patches, the interleaver circuit configured to interleave pixels of at least three of the warped patches, wherein each of the at least three warped patches is of a different image channel.

5. The patch processor of claim 4, wherein the patch warper circuit further comprises:
   a front buffer coupled to the sampling circuit and the transformation circuit, the front buffer configured to buffer the patches of the input image data received from the demultiplexer circuit for reading by the sampling circuit or the transformation circuit; and
   a back buffer coupled to the interleaver circuit, the back buffer configured to buffer the warped patches received from the interleaver circuit.

6. The patch processor of claim 4, wherein the interleaver circuit interleaves pixels of warped patches of three image channels including RGB color channels or YCbCr color channels.

7. The patch processor of claim 1, wherein the patch processor further comprises:
   a register circuit accessed by the patch direct memory access circuit and the patch warper circuit to receive the first and second warping parameters.

8. The patch processor of claim 7, wherein the second warping parameter includes a set of coordinates of the warped patches in output images.

9. The patch processor of claim 7, wherein the register circuit is further accessed by a demultiplexer circuit to forward the patches of the input image data selectively to components of the patch warper circuit.

10. The patch processor of claim 1, wherein at least one of the warped patches is a non-rectangular shape.

11. A method comprising:
    retrieving, by a patch direct memory access circuit, patches of input image data from a source memory via direct memory access using a first warping parameter indicating at least one coordinate of the patches, the patches corresponding to a subset of the input image data;
    warping, by a patch warper circuit, the retrieved patches of the input image data by processing the patches of the input image data according to a second warping parameter to generate warped patches; and
    sending the warped patches from the patch warper circuit to a target component.

12. The method of claim 11, further comprising:
    selectively forwarding, by a demultiplexer circuit, the patches of the input image data to an transformation circuit for adding or subtracting pixel data in the patches of the input image data or a sampling circuit for generating the warped patches by interpolating the pixel data in the patches of the input image data.

13. The method of claim 12, further comprising:
    receiving, by an interleaver circuit, the warped patches; and
    interleaving, by the interleaver circuit, pixels of at least three of the warped patches, wherein each of the at least three warped patches is of a different image channel.

14. The method of claim 13, further comprising:
    buffering, by a front buffer, the patches of the input image data received from the demultiplexer circuit for reading by the sampling circuit or the transformation circuit; and
    buffering, by a back buffer, the warped patches received from the interleaver circuit.

15. The method of claim 13, further comprising:
    interleaving, by the interleaver circuit, pixels of warped patches of three image channels including RGB color channels or YCbCr color channels.

16. The method of claim 11, further comprising:
    accessing, by the patch direct memory access circuit and the patch warper circuit, a register circuit to receive the first and second warping parameters.

17. The method of claim 16, wherein the second warping parameter includes a set of coordinates of the warped patches in output images.

18. The method of claim 11, further comprising:
processing, by a sampling circuit, the patches of the input data using bilinear interpolation in a raster scan fashion.

19. The method of claim 11, wherein at least one of the warped patches is a non-rectangular shape.

20. An electronic device comprising:
a source memory configured to store input image data; and
an image signal processor coupled to the source memory, the image signal processor comprising:
  a patch direct memory access circuit coupled to a source memory and configured to obtain patches of the input image data from a source memory via direct memory access using a first warping parameter indicating at least one coordinate of the patches, the patches corresponding to a subset of the input image data, and
  a patch warper circuit coupled to the patch direct memory access circuit to receive the patches of the input image data, the patch warper circuit configured to warp the patches of the input image data by processing the patches of the input image data according to a second warping parameter to generate warped patches.

* * * * *